(12) United States Patent
Lin

(10) Patent No.: US 6,755,120 B1
(45) Date of Patent: Jun. 29, 2004

(54) COFFEEPOT

(75) Inventor: Yu-Yuan Lin, Tainan (TW)

(73) Assignee: Uni-Splendor Corp., Tainan (TW)

( * ) Notice: Subject to any disclaimer, the term of this patent is extended or adjusted under 35 U.S.C. 154(b) by 0 days.

(21) Appl. No.: 10/640,554

(22) Filed: Aug. 13, 2003

(51) Int. Cl.⁷ .............................. A23L 1/00; A23L 2/54; A23F 3/00; A47G 19/14; A47J 31/10

(52) U.S. Cl. ...................... 99/323.3; 99/275; 222/465.1; 222/469; 222/475.1

(58) Field of Search ........................ 99/483, 495, 323.3, 99/275, 279, 297, 287, 310, 314, 307, 285; 220/832, 912, 737, 758; 215/759, 769, 235, 396; 222/144.5, 475.1, 507, 518, 500, 469, 468, 571, 470–474, 465.1

(56) References Cited

U.S. PATENT DOCUMENTS

| | | | | | |
|---|---|---|---|---|---|
| 1,440,947 | A | * | 1/1923 | William ...................... 222/192 |
| 1,662,020 | A | * | 3/1928 | William ................. 222/189.07 |
| 3,696,733 | A | * | 10/1972 | Beverett ....................... 99/307 |
| 3,715,974 | A | * | 2/1973 | Beverett ....................... 99/285 |
| 3,974,758 | A | * | 8/1976 | Stone, Jr. ..................... 99/275 |
| 3,991,664 | A | * | 11/1976 | Yamato ........................ 99/310 |
| 4,251,004 | A | * | 2/1981 | Sun ............................. 220/4.01 |
| 4,398,454 | A | * | 8/1983 | Lambros et al. .............. 99/285 |
| 5,110,016 | A | * | 5/1992 | Heimann et al. ........ 222/475.1 |
| D364,307 | S | * | 11/1995 | Chang ......................... D7/322 |
| 6,085,946 | A | * | 7/2000 | Hirsch et al. ............ 222/475.1 |
| 6,302,307 | B1 | * | 10/2001 | Hirsch et al. ............... 222/500 |
| 6,422,133 | B1 | * | 7/2002 | Brady .......................... 99/297 |

* cited by examiner

Primary Examiner—Timothy F. Simone
(74) Attorney, Agent, or Firm—Alan D. Kamrath; Nikolai & Mersereau, P.A.

(57) ABSTRACT

A coffeepot comprises a body, a handle assembly, a lid connecting assembly, a discharge control assembly, a check valve, a disc-shaped abutment assembly, a push member, and a disc-shaped lid. In a closed state of the check valve, press the push member to lower the discharge control assembly a distance with a spring of the discharge control assembly being compressed, a gap is formed between a base of the discharge control assembly and the lid connecting assembly, a coffee discharge passageway is formed from the gap to a spout through a passageway of the lid connecting assembly, and tilt the body will pour coffee out of the spout via the coffee discharge passageway. Further, in an open state of the check valve, releasing the push member will close the coffee discharge passageway.

3 Claims, 5 Drawing Sheets

COFFEEPOT

BACKGROUND OF THE INVENTION

1. Field of the Invention

The present invention relates to coffeepots and more particularly to a drip coffeepot with improved characteristics.

2. Description of Related Art

A conventional coffeepot 10 is shown in FIG. 1 and comprises a body 20 having a top opening 201, a handle 30 having a spout 301 adjacent the opening 201 and a ring seat 302 between the spout 301 and the opening 201, the ring seat 302 having an outer threaded section, and a lid 40 having an inner threaded section completely threadedly secured to the outer threaded section of the ring seat 302 when the lid 40 is completely closed, and a dome-shaped top 401. In operation, a user can unfasten the lid 40 by counterclockwise turning the lid 40 about the handle 30 until the lid 40 has risen to a desired height. Next, tilt the coffeepot 10 to pour coffee out of the spout 301 via the opening 201 and a gap 50 between the bottom of the lid 40 and the ring seat 302 as indicated by arrows.

However, the prior art suffered from several disadvantages. For example, a user cannot assure whether coffee discharge passageway is open or not by counterclockwise turning the lid 40 about the handle 30. Thus, it is often that either the coffee discharge passageway is still closed after several times of turning or the lid 40 is completely disengaged from the handle 30. In the former case, a tilting of the coffeepot 10 still cannot pour coffee out. In a later case, a small portion of hot coffee may discharge from the spout 301 and a large portion of hot coffee may undesirably discharge from the top opening 201 since the lid 40 has separated from the coffeepot 10. This is not a safe design. Thus, the need for improvement still exists.

SUMMARY OF THE INVENTION

It is an object of the present invention to provide a coffeepot comprising a body for storing coffee a top opening and a plurality of risers equally spaced apart along a top periphery; a handle assembly comprising a ring seat conformed to and secured to the top opening, a spout extended outward from a periphery of the ring seat, a handle member, and a plurality of interior slits equally spaced apart along an inner surface of the ring seat; a lid connecting assembly shaped to snugly fit in the ring seat, the lid connecting assembly comprising a passageway in communication with the spout, a funnel-shaped channel, a recess at an upper periphery, an upper threaded section, a plurality of projections equally spaced apart along a lower periphery, the projections being secured to the slits, and a first central hole; a discharge control assembly having an upper part fitted in the first central hole and being slidable therealong, the discharge control assembly comprising a disc-shaped base, a post extended upward from the base through the first central hole, an annular flange on an outer surface of the post, resilient means put on the post and supported by the flange, and a C-shaped member pressed on the resilient means; a check valve conformed to and mounted in the funnel-shaped channel, the check valve comprising a seat having a plurality of perforated openings, a steel ball on a center of the seat, and a cap pressed on the steel ball so as to be in contact with the seat; a disc-shaped abutment assembly comprising a second central hole put on the post and a plurality of lugs equally spaced apart along a periphery, each lug having a hole therethrough; a push member having a part conformed to and put on the second central hole, and another part conformed to and seated on the recess; and a disc-shaped lid comprising an inner threaded section secured to the upper threaded section, and a recessed portion with the push member passed therethrough, wherein in a closed state of the check valve, press the push member to lower the discharge control assembly a distance with the resilient means being compressed, a gap is formed between the base and the lid connecting assembly, a coffee discharge passageway is formed from the gap to the spout through the passageway, and tilt the body will pour coffee out of the spout via the coffee discharge passageway; and in an open state of the check valve, release the push member causes the resilient means to return to its normal state by expansion with the post being lifted and the base being moved upward to urge against the lid connecting assembly for closing the coffee discharge passageway.

In one aspect of the present invention, an ergonomic member is formed to fit onto the handle member by snapping.

The above and other objects, features and advantages of the present invention will become apparent from the following detailed description taken with the accompanying drawings.

DETAILED DESCRIPTION OF THE PREFERRED EMBODIMENTS

Figure 1:
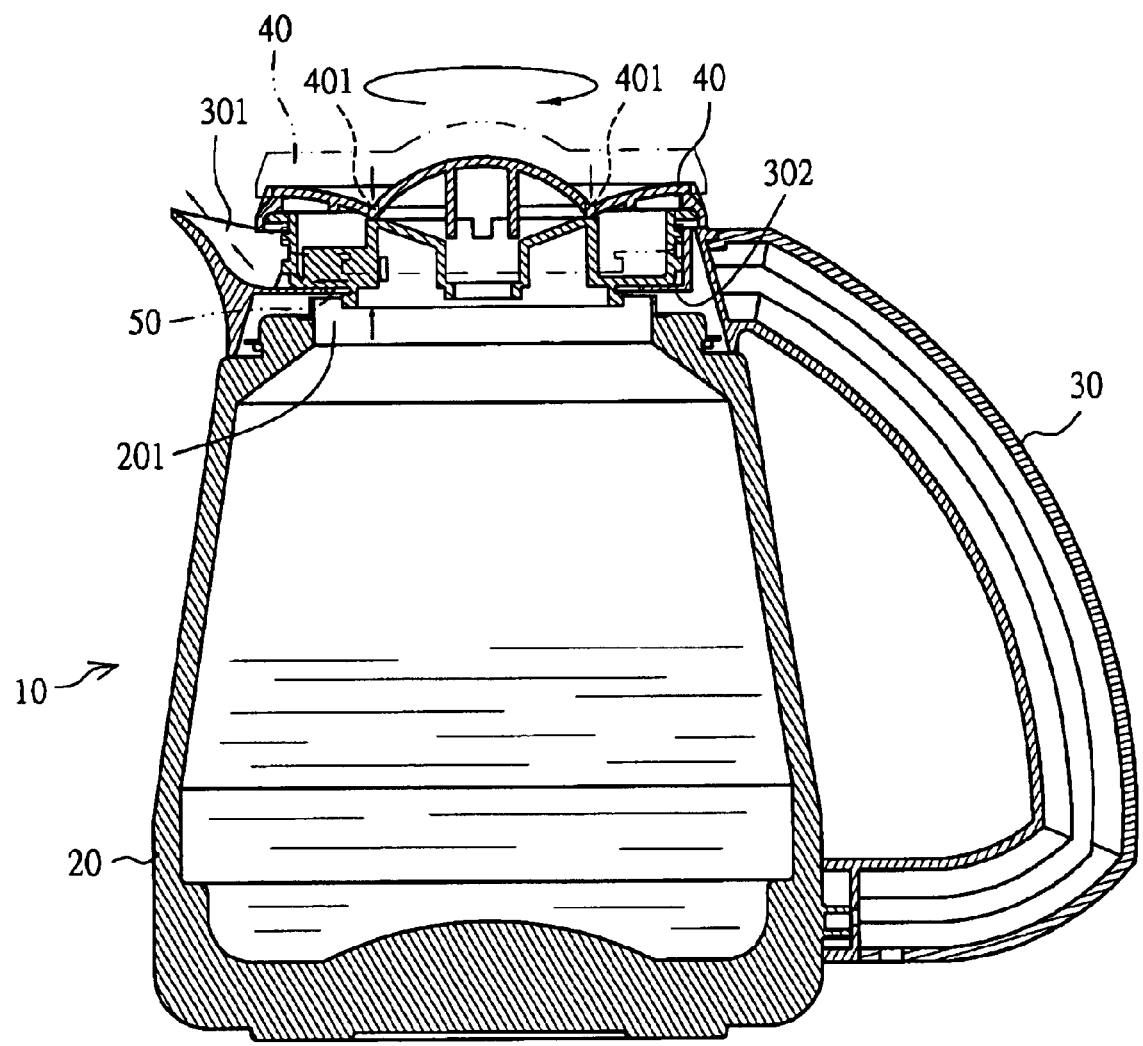
FIG. 1 is a sectional view of a conventional coffeepot.
Figure 2:
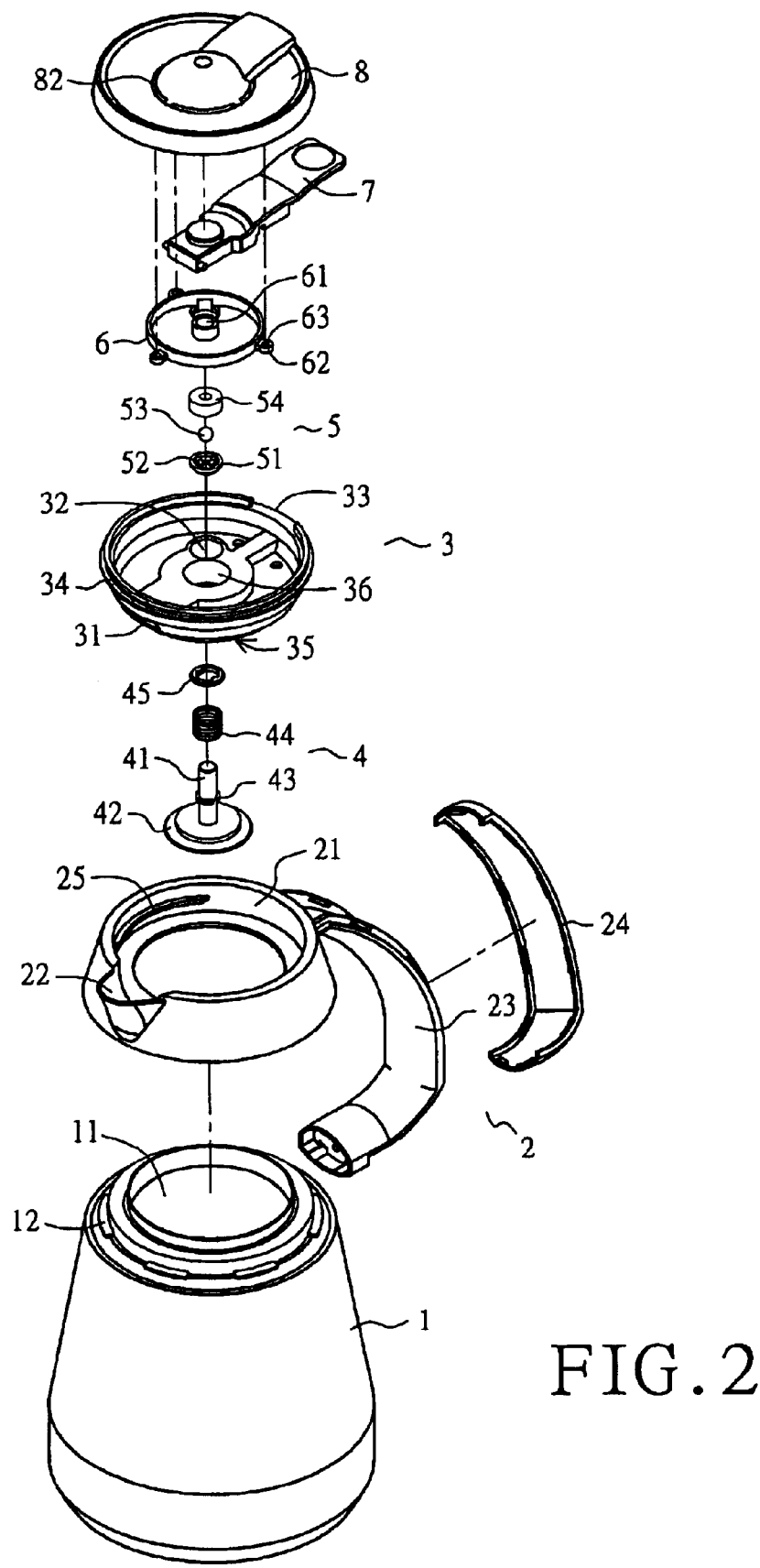
FIG. 2 is a perspective view of a preferred embodiment of coffeepot according to the invention.

Referring to FIGS. 2 to 5, there is shown a coffeepot constructed in accordance with the invention. The coffeepot comprises a body 1, a handle assembly 2, a lid connecting assembly 3, a discharge control assembly 4, a check valve 5, an abutment assembly 6, a push member 7, and a lid 8. Each component will be described in detail below.

The body 1 comprises a top opening 11 and a plurality of risers 12 equally spaced apart along a top periphery. The handle assembly 2 comprises a ring seat 21 conformed to the opening 11, a spout 22 extended outward from a periphery of the ring seat 21, a handle member 23, an ergonomic member 24 fitted onto the handle member 23, and a plurality of interior slits 25 equally spaced apart along an inner surface of the ring seat 21. The lid connecting assembly 3 is shaped to snugly fit in the ring seat 21. The lid connecting assembly 3 comprises a passageway 31 open to a periphery, a funnel-shaped channel 32, a recess 33 at the periphery, an upper threaded section 34, a plurality of projections 35 equally spaced apart along a lower periphery, and a central hole 36.

The discharge control assembly 4 comprises a disc-shaped base 42, a post 41 extended upward from the base 42, an annular flange 43 on an outer surface of the post 41, a spring (e.g., torsion spring) 44 put on the post 41 and supported by the flange 43, and a C-shaped member 45 pressed on the spring 44. The upper part of the discharge control assembly 4 is fitted in the central hole 36 and is slidable therealong. The check valve 5 is conformed to and is mounted in the funnel-shaped channel 32. The check valve 5 comprises a seat 51, a plurality of openings 52 on the seat 51, a steel ball 53 on a center of the seat 51, and a cap 54 pressed on the steel ball 53 so as to be in contact with the seat 51 (see circle I in FIG. 3).

The disc-shaped abutment assembly 6 comprises a central hole 61 put on the post 31 and a plurality of (three) lugs 62 equally spaced apart along a periphery, each lug 62 having a hole 63 therethrough. The push member 7 has a part conformed to and put on the annular flange on the central hole 61, and another part conformed to and seated on the recess 33. The lid 8 is conformed to and snugly fitted on the upper threaded section 34. The disc-shaped lid 8 comprises an inner threaded section 81, a plurality of cavities 82 equally spaced apart along a top circle, and a recessed portion 83 with the push member 7 passed therethrough.

An assembly of the invention will now be described in detail below. First, snap the ergonomic member 24 onto the handle member 23. Next, put the ring seat 21 on top of the body 1 with the risers 12 snugly fitted in bottom slots (not shown) of the handle assembly 2. Next, mount the check valve 5 in the funnel-shaped channel 32. Next, insert the post 41 through the central holes 36 and 61. Next, place a part of the push member 7 on the annular flange on the central hole 61 and another part thereof on the recess 33. Next, threadedly secure the abutment assembly 6 to the lid 8. Next, secure the inner threaded section 81 to the upper threaded section 34. Finally, secure the projections 35 to the slits 25. As a result, a complete coffeepot is formed.

Figure 3:
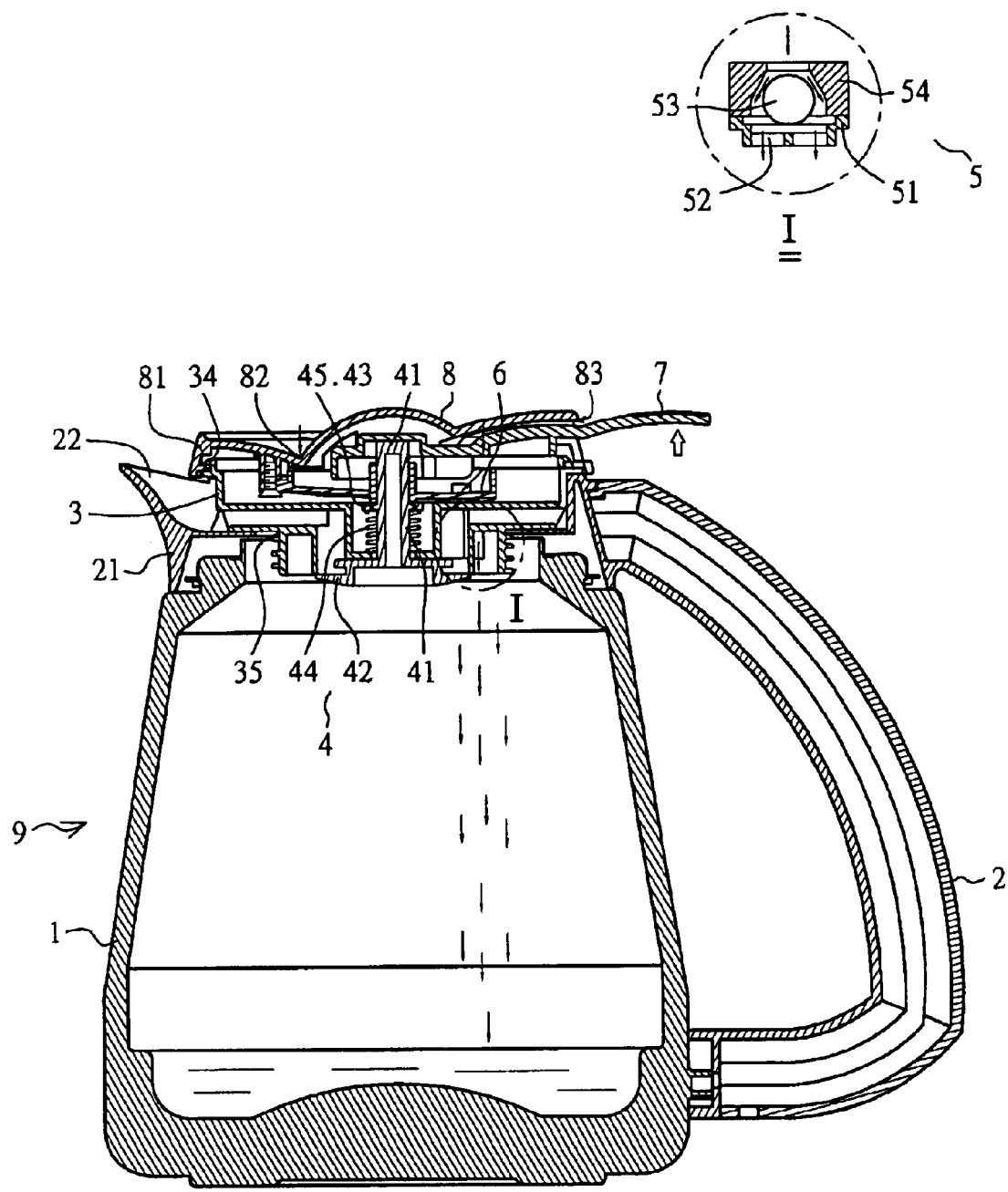
FIG. 3 is a sectional view of the assembled coffeepot shown in FIG. 2, where the coffeepot is in a nonoperating position.
Figure 4:
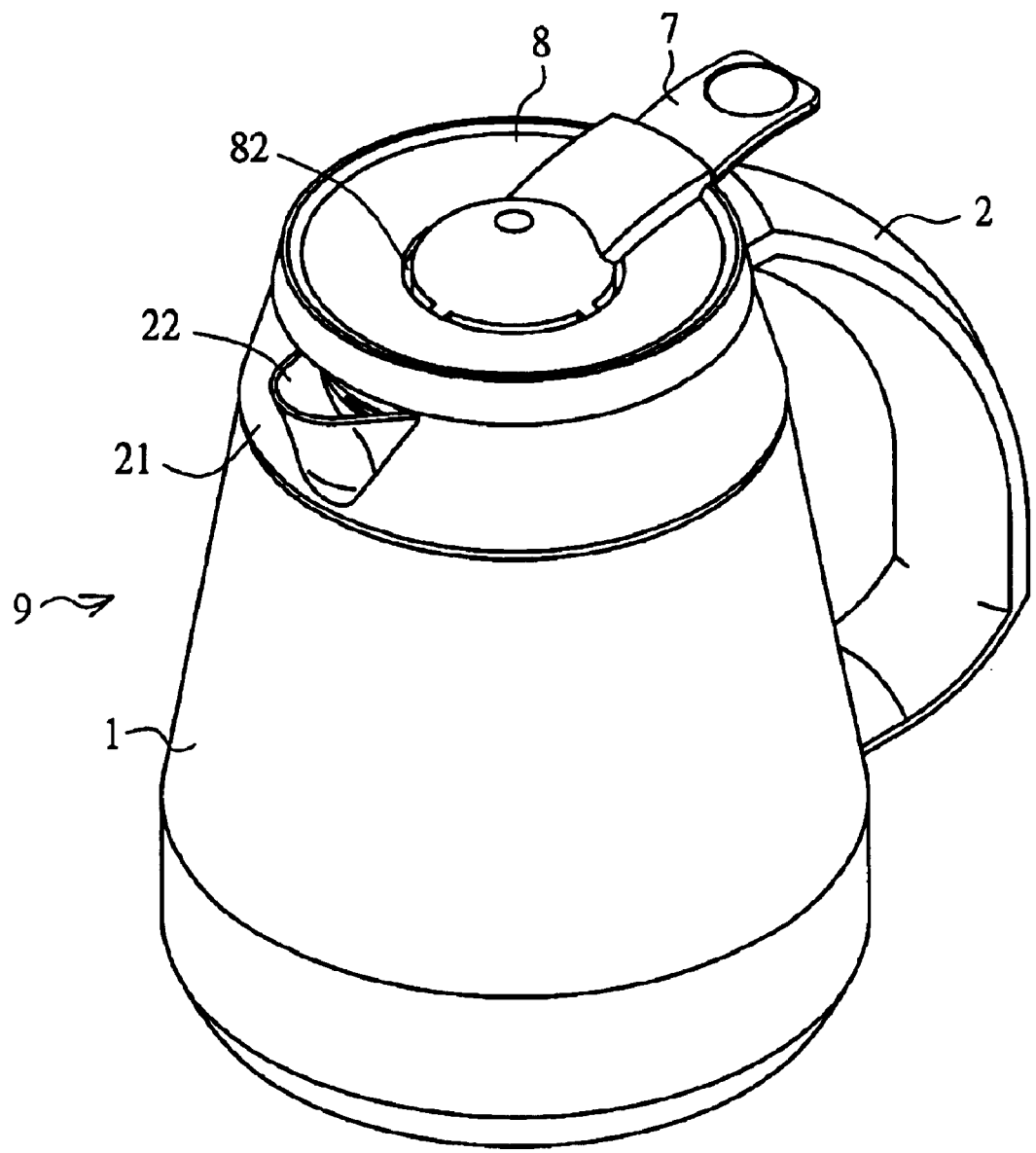
FIG. 4 is a perspective view of the coffeepot shown in FIG. 2.
Figure 5:
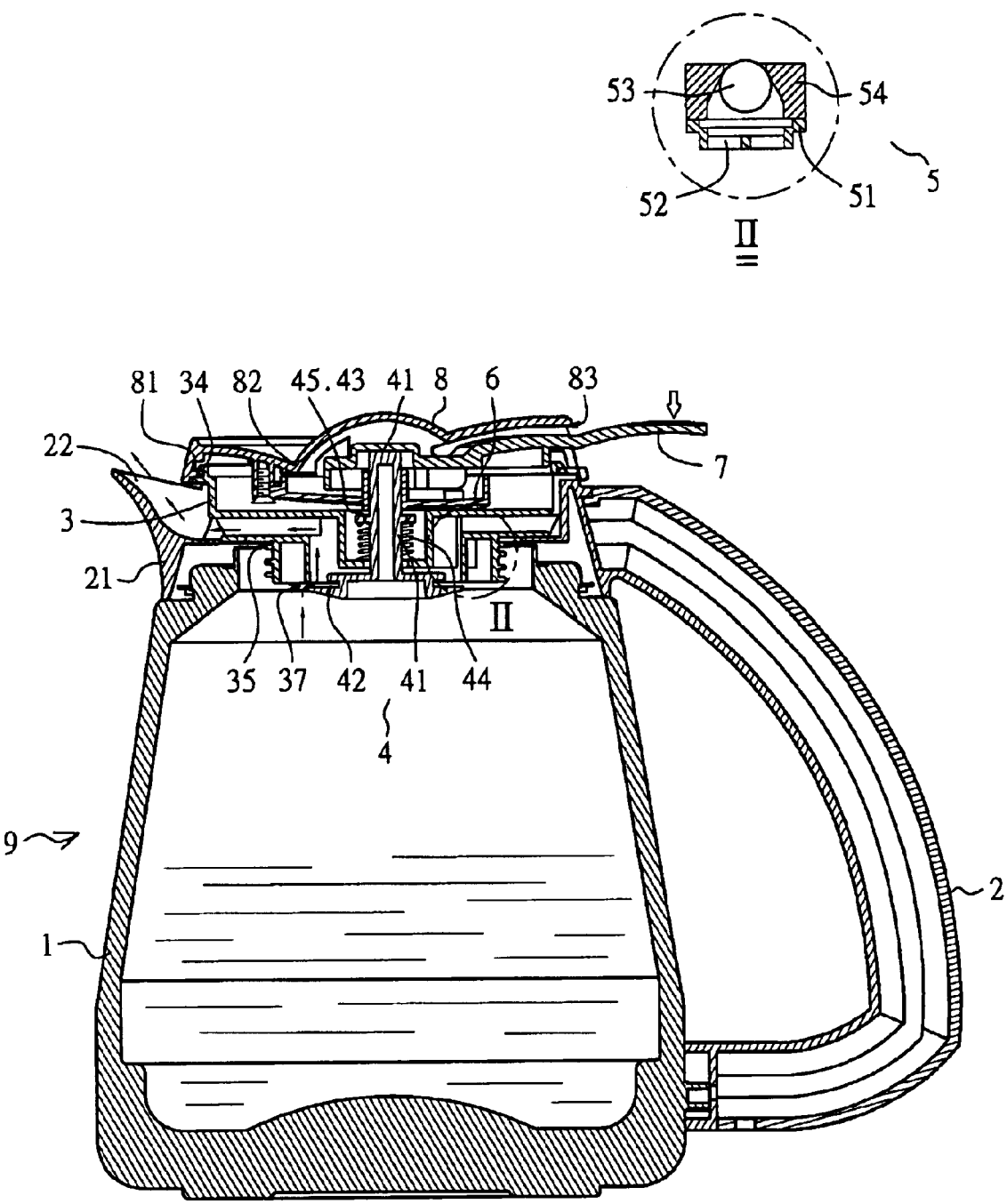
FIG. 5 is a view similar to FIG. 3, where the coffeepot is in an operating position.

An operation of the invention will now be described in detail below. For pouring coffeepot in a closed state of the check valve 5 (i.e., coffee is prevented from dripping into the body 1) as shown in FIG. 5, press the push member 7 to lower the discharge control assembly 4 a distance with the spring 44 being compressed. At the moment, a gap 37 is formed between the base 42 and the top of the lid connecting assembly 3 and thus a coffee discharge passageway (as indicated by arrows) from the gap 37 to the spout 22 through the passageway 31 is formed. As an end, coffee is able to flow out of the spout 22 via the coffee discharge passageway by tilting the coffeepot. To the contrary, in a nonoperating position with the check valve 5 in an open state (i.e., coffee is allowed to drip into the body 1) as shown in FIG. 3, release the push member 7 will cause the spring 44 to expand to return to its normal state with the post 41 being lifted. Also, the base 42 moves upward to urge against the lid connecting assembly 3. As an end, the coffee discharge passageway is closed.

While the invention herein disclosed has been described by means of specific embodiments, numerous modifications and variations could be made thereto by those skilled in the art without departing from the scope and spirit of the invention set forth in the claims.

What is claimed is:

1. A coffeepot, comprising:

a body for storing coffee a top opening and a plurality of risers equally spaced apart along a top periphery;

a handle assembly comprising a ring seat conformed to and secured to the top opening, a spout extended outward from a periphery of the ring seat, a handle member, and a plurality of interior slits equally spaced apart along an inner surface of the ring seat;

a lid connecting assembly shaped to snugly fit in the ring seat, the lid connecting assembly comprising a passageway in communication with the spout, a funnel-shaped channel, a recess at an upper periphery, an upper threaded section, a plurality of projections equally spaced apart along a lower periphery, the projections being secured to the slits, and a first central hole;

a discharge control assembly having an upper part fitted in the first central hole and being slidable therealong, the discharge control assembly comprising a disc-shaped base, a post extended upward from the base through the first central hole, an annular flange on an outer surface of the post, resilient means put on the post and supported by the flange, and a C-shaped member pressed on the resilient means;

a check valve conformed to and mounted in the funnel-shaped channel, the check valve comprising a seat having a plurality of perforated openings, a steel ball on a center of the seat, and a cap pressed on the steel ball so as to be in contact with the seat;

a disc-shaped abutment assembly comprising a second central hole put on the post and a plurality of lugs equally spaced apart along a periphery, each lug having a hole therethrough;

a push member having a part conformed to and put on the second central hole, and another part conformed to and seated on the recess; and a disc-shaped lid comprising an inner threaded section secured to the upper threaded section, and a recessed portion with the push member passed therethrough, wherein in a closed state of the check valve, by pressing the push member to lower the discharge control assembly a distance with the resilient means being compressed, a gap is formed between the base and the lid connecting assembly, a coffee discharge passageway is formed from the gap to the spout through the passageway, and tilting the body will pour coffee out of the spout via the coffee discharge passageway, and in an open state of the check valve, by releasing the push member causes the resilient means to return to its normal state by expansion with the post being lifted and the base being moved upward to urge against the lid connecting assembly for closing the coffee discharge passageway.

2. The coffeepot of claim 1, wherein the resilient means is a torsion spring.

3. The coffeepot of claim 1, further comprising an ergonomic member fitted onto the handle member by snapping.

* * * * *